Feb. 23, 1943. I. C. McKECHNIE 2,311,953
AUTOMOBILE AIR CONDITIONING SYSTEM
Filed July 8, 1939
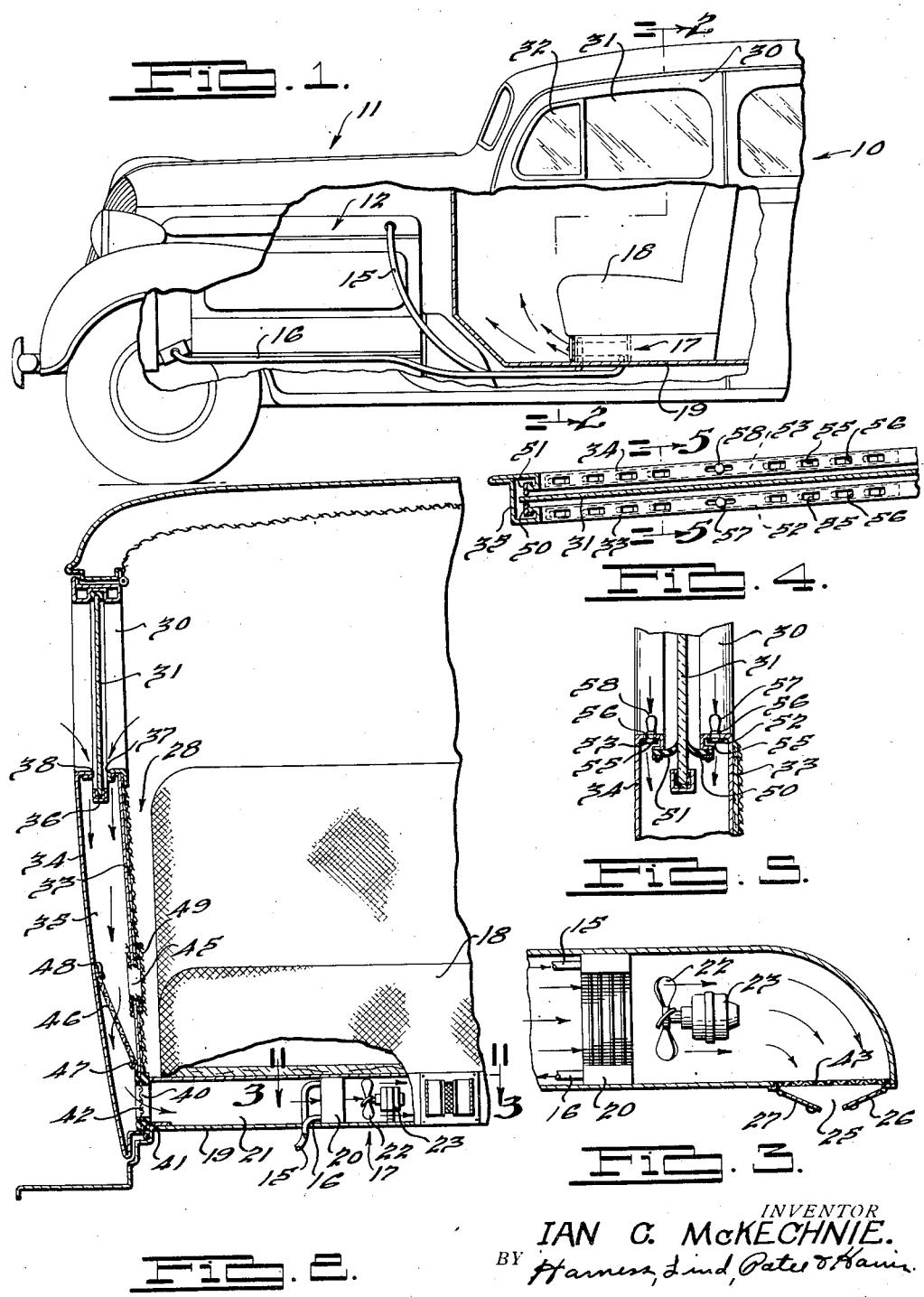
INVENTOR
IAN C. McKECHNIE.
BY Harness, Dind, Pater & Hanin
ATTORNEYS.

UNITED STATES PATENT OFFICE 2,311,953

AUTOMOBILE AIR CONDITIONING SYSTEM

Ian C. McKechnie, Highland Park, Mich., assignor to Chrysler Corporation, Highland Park, Mich., a corporation of Delaware Application July 8, 1939, Serial No. 283,336

14 Claims. (Cl. 98—2)

This invention pertains to an automobile air conditioning system, and has primarily for its object the provision of an improved air circulating system whereby fresh air may be added to recirculated air from the tonneau of the automobile and the mixture passed through and from an air temperature modifying device in such a manner that all parts of the tonneau may be supplied with conditioned air.

Incidental to the foregoing, a more specific object of the present invention resides in the provision of simple, inexpensive and efficient means for causing a circulation of air across the the glass panels or windows of the doors of the automobile in order that fogging of the glass may be prevented by the circulation of air in winter, or at other times conducive to the condensation of moisture on the glass panels, whereby greater safety in driving is afforded.

Another object of the present invention is to provide means for conditioning air in the tonneau of an automobile whereby a circulation of air to all occupants of the tonneau may be accomplished, thus overcoming the objection to automobile heating or cooling systems wherein occupants of the front and rear compartments are either too hot or too cold.

A further object of the present invention is to provide air conditioning means for an automobile including an inlet duct system having simple, easily manufactured and inexpensive provisions for the control of the air conditioning system such that either fresh air alone or recirculated air alone, or a mixture of both fresh and recirculated air, may be passed through the air temperature modifying device.

A further object of the present invention is to provide means in an air conditioning system for an automobile whereby air admitted from the outside as well as air recirculated through the tonneau of the automobile from the interior thereof may be passed through a replaceable filter in order that dust and other foreign material may be removed from the air.

Other objects and advantages of the present invention may best be understood from a study of the following specification and accompanying drawing wherein two forms of the present invention are illustrated.

In the drawing,

Fig. 1 is a partially cut away view of the front portion of an automobile having the present invention applied thereto;

Fig. 2 is a vertical section through the right half of the front compartment of the automobile taken substantially along line 2—2 of Fig. 1;

Fig. 3 is a horizontal section on an enlarged scale taken substantially along line 3—3 of Fig. 2;

Fig. 4 is a detail view of a modified form of door construction made in accordance with the present invention; and Fig. 5 is an enlarged vertical section taken substantially along line 5—5 of Fig. 4.

In the present disclosure a portion of an automobile comprising the tonneau 10 and the engine compartment 11 is illustrated. Mounted within the engine compartment is the usual internal combustion engine 12 having the usual water circulating and cooling system incorporated therein in order that the engine temperature may be kept below a certain level. As is usual practice, the engine block may have outlet plugs therein for the connection of circulating hoses 15 and 16, whereby heated water may be circulated through a temperature modifying device 17 located beneath the front seat 18 and mounted upon the floor panel 19. The usual water circulating system may thus be utilized to circulate hot water from the engine through the temperature modifying device 17 whereby the temperature of air passing through the device may be raised. It is, of course, to be appreciated that the circulation of the heating water may be stopped when desired, permitting the circulation of air through the tonneau without altering the temperature thereof or that a cooling medium may be circulated through the air temperature modifying device in order that the temperature of the air may be lowered during hot weather.

The air temperature modifying device comprises a preferably finned coil or radiator 20 mounted upon the floor board 19 and occupying a complete transverse section of the casing 21 through which air may be circulated in order to have the temperature thereof altered as desired. The circulation of air may be effected by means of a blower 22 driven by a motor 23 mounted in the interior of the casing 21 and controlled by suitable control means (not shown). Air which is drawn through the casing 21 is ejected through an outlet opening 25 preferably having a plurality of doors 26 and 27 whereby the amount of air may be controlled, said opening 25 facing forward into the lower part of the front compartment of the tonneau in order that air may be circulated upward toward the windshield of the automobile. The front seat 18 of the automobile is preferably spaced from the side walls thereof in order to leave passageways 28 between the ends of the front seat and the side walls so that the air which is circulated forwardly and upwardly may circulate rearwardly through the upper portion of the tonneau and be drawn back toward the front through the spaces 28 thereby causing a mild circulation of air to reach all parts of the tonneau.

The automobile is shown as being provided with the usual hinged door 30 in which is mounted a glass panel 31 adapted to be raised or lowered as desired and which, in the case of the front door, is provided with the usual deflector panel 32 providing for withdrawal of exhausted air from the tonneau when such withdrawal is desired. As seen in Fig. 2, the door 30 comprises an inner wall 33 and an outer wall 34, joined by relatively narrow end walls such as wall 35, which walls enclose a space utilized as an air duct in the present invention. The sliding glass panel 31 is mounted on the window portion of the door 30 and is partially encircled by a channel strip 36 which protects the edge of the panel and guides the panel so as to occupy a plane substantially midway between the inner and outer walls. The upper edges of the inner and outer walls are bent inwardly so as to form the usual window frame portions of the automobile door and are spaced from the surfaces of the glass panel so as to provide air inlet openings 37 and 38, respectively, the air inlet opening 37 permitting the entrance of recirculated air from the tonneau and the air inlet opening 38 permitting the entrance of fresh air from outside the tonneau, whether the glass panel 31 be closed or not. The lower portion of the inner wall 33 is provided with an opening 40 so positioned and arranged as to register with the inlet opening of the casing 21 when the door is closed, the inner wall preferably having a resilient rubber or rubber-like sealing ring 41 mounted thereon at the edge of said opening 40 whereby to seal the passageway formed by the door and the casing when the door is closed. A screen 42 is preferably mounted on the opening 40, and a screen 43 is preferably mounted on the opening 25 in order that large objects may be prevented from passing through the air conditioning system.

In a preferred arrangement of my invention the inner wall 33 is also provided with an intermediate opening 45 through which a removable filter 46 may be inserted. The filter is preferably supported on a bracket 47 fixed to the inner surface of the inner wall 33 and retained in position by a clip 48 fixed to the inner surface of the outer wall at a higher level so that the filter may occupy a position substantially entirely across the door space at an acute angle so that a large filtering surface may be provided. The access opening 45 is preferably closed by an ornamental flap 49 which is of such a character as to remain in position to obstruct the flow of air through the opening 45.

In the modification of the present invention disclosed in Figs. 4 and 5, the inwardly turned edges of the window frame portions of the inner wall 33 and outer wall 34 are provided with rubber-like sealing strips 50 and 51, respectively, which engage the surface of the sliding glass panel 31 in order that air may be prevented from passing into the interior of the door unless desired in which case an air shutter may be opened. The shutter comprises a sliding panel 52 at the upper edge of the inner wall 33 and a sliding panel 53 at the upper edge of the outer wall 34, each of which may be provided with a series of openings 55 registering with openings 56 in the walls 33 and 34. The sliding panels 52 and 53 may be operated by manipulation of handles 57 and 58, respectively, so as to slide longitudinally and cause registry of the matching openings when the admission of air is desired and blocking of the openings when exclusion of air is desired. In this manner fresh air alone or outside air alone, or a combination of both, may be admitted to the air temperature modifying device, in order that a comfortable condition may be created within the interior of the automobile.

In both forms of the invention illustrated and described herein, it is to be noted that circulation of the air is accomplished so as to take advantage of the effect of heated air rising to the upper level of the interior of the car. Thus, if the air temperature modifying device is used for heating the air the heated air will rise upward through the front compartment of the automobile and will circulate rearwardly through the upper portion of the tonneau, thence returning through the lower portion of the rear compartment and through the passageways provided between the ends of the front seat and the sides of the automobile. Another point to be noticed is that in all cases the air is drawn downwardly through the door space thereby causing a movement of air across the glass surfaces of the side windows, thus serving to prevent the condensation of moisture thereon. If the air temperature modifying device is used for the circulation of a cooling medium, the coolest air will be forced upwardly through the front compartment and by the time that its velocity has been expended will have reached the upper portion of the front compartment where static pressure should force it rearwardly and where it will drop to the lower portion of the rear compartment due to its heavier weight. Even in cases where the air temperature is not modified, the apparatus is so constructed and arranged that static pressure and velocity will cause a circulation from the lower portion of the front compartment upwardly through the middle of the front compartment, thence rearwardly and through the rear compartment and forward along the side walls of the automobile into the inlet openings adjacent the glass panels.

Having illustrated and described several preferred embodiments of the present invention, it should be apparent to those skilled in the art that the same permits of various modifications in arrangement and details. All such as come within the scope of the following claims are considered a part of my invention.

I claim:

1. In an automobile, an air conditioning system for the tonneau thereof comprising an air temperature modifying device positioned in the tonneau and having an inlet, and an air inlet duct for admitting air to said temperature modifying device comprising a door having an inner and an outer wall, said door having a glass panel slidably mounted therein between said inner and outer walls and so positioned as to occupy a plane substantially midway between said inner and outer walls, said inner wall having an edge spaced from said glass panel so as to provide an opening for the admission of air into said space from the interior of said tonneau, and said inner wall having an outlet opening for the air admitted thereto so located and arranged as to register with the inlet to said air temperature modifying device when said door is closed.

2. In an automobile, an air conditioning system for the tonneau thereof comprising an air temperature modifying device positioned in the tonneau and having an inlet, and an air inlet duct for admitting air to said temperature modifying device comprising a door having an inner and an outer wall, said door having a glass panel slidably mounted therein between said inner and outer walls and so positioned as to occupy a plane substantially midway between said inner and outer walls, said inner wall having an edge spaced from said glass panel so as to provide an opening for the admission of air into said space from the interior of said tonneau, said inner wall having an outlet opening for the air admitted thereto so located and arranged as to register with the inlet to said air temperature modifying device when said door is closed, and said outer wall having an edge spaced from said glass panel so as to provide an opening for the admission of fresh air into said space from outside said tonneau.

3. In an automobile, an air conditioning system for the tonneau thereof comprising an air temperature modifying device positioned in the tonneau and having an inlet, and an air inlet duct for admitting air to said temperature modifying device comprising a door having an inner and an outer wall, said door having a glass panel slidably mounted therein between said inner and outer walls and so positioned as to occupy a plane substantially midway between said inner and outer walls, said inner wall having openings adjacent the window portion thereof for the admission of air into said space from the interior of said tonneau, and said inner wall having an outlet opening for the air admitted thereto so located and arranged as to register with the inlet to said air temperature modifying device when said door is closed, in combination with means associated with said inner wall to close said openings for the admission of air.

4. In an automobile, an air conditioning system for the tonneau thereof comprising an air temperature modifying device positioned in the tonneau and having an inlet, and an air inlet duct for admitting air to said temperature modifying device comprising a door having an inner and an outer wall, said door having a glass panel slidably mounted therein between said inner and outer walls and so positioned as to occupy a plane substantially midway between said inner and outer walls, said inner wall having openings adjacent the window portion thereof for the admission of air into said space from the interior of said tonneau, said inner wall having an outlet opening for the air admitted thereto so located and arranged as to register with the inlet to said air temperature modifying device when said door is closed, and said outer wall having openings therein adjacent the window portion thereof for the admission of fresh air into said space from outside said tonneau, in combination with means associated with said inner and outer walls to close said openings for the admission of air.

5. In an automobile, an air conditioning system for the tonneau thereof comprising an air temperature modifying device positioned in the tonneau and having an inlet, and an air inlet duct for admitting air to said temperature modifying device comprising a door having an inner and an outer wall, said door having a glass panel slidably mounted therein between said inner and outer walls and so positioned as to occupy a plane substantially midway between said inner and outer walls, said inner wall having openings adjacent the window portion thereof for the admission of air into said space from the interior of said tonneau, said inner wall having an outlet opening for the air admitted thereto so located and arranged as to register with the inlet to said air temperature modifying device when said door is closed, and said outer wall having openings therein adjacent the window portion thereof for the admission of fresh air into said space from outside said tonneau, in combination with means associated with said inner and outer walls to close said openings for the admission of air, said temperature modifying means comprising a casing located under the front seat of the automobile and having an outlet into the lower part of the front compartment of the automobile.

6. In an automobile, an air conditioning system comprising a door having an inner and outer wall forming an air space therein, one of said walls having an air inlet therein and another of said walls having an air outlet therein so that said door serves as a duct of said air conditioning system, said inner wall having a filter retaining means mounted thereon and said outer wall having a filter retaining means mounted thereon at a different level whereby a filter may be mounted in said door space and extending diagonally across said door space from the inner wall to the outer wall, said inner wall having an access opening therein adjacent said filter retaining means and of sufficient size to permit passage of said filter therethrough whereby a filter may be removably associated with said door.

7. In an automobile, an air conditioning system comprising a door having an inner and outer wall forming an air space therein, one of said walls having an air inlet therein and another of said walls having an air outlet therein so that said door serves as a duct of said air conditioning system, said inner wall having a filter retaining means mounted thereon and said outer wall having a filter retaining means mounted thereon at a different level whereby a filter may be mounted in said door space and extending diagonally across said door space from the inner wall to the outer wall, said inner wall having an access opening therein adjacent said filter retaining means and of sufficient size to permit passage of said filter therethrough whereby a filter may be removably associated with said door, and said inner wall having an ornamental flap thereon for covering and sealing said access opening.

8. In an automobile, an air conditioning system comprising temperature modifying means having an inlet located adjacent the floor level of the tonneau and air moving means for moving air through the temperature modifying means, a door for said automobile having a window portion, said door having a double wall construction providing an interior space forming an inlet duct for said air conditioning system, said door having an air inlet thereinto located adjacent said window portion of the door and an air outlet therefrom adapted to register with the inlet to said temperature modifying means when the door is closed, and damper means adjustably positioned at said inlet opening to control the admission of air therethrough.

9. In an automobile, an air conditioning system comprising temperature modifying means having an inlet located adjacent the floor level of the tonneau and air moving means for moving air through the temperature modifying means, a door for said automobile having a window portion, said door having a double wall construction providing an interior space forming an inlet duct for said air conditioning system, said door having an air inlet thereinto located adjacent said window portion of the door and an air outlet therefrom adapted to register with the inlet to said temperature modifying means when the door is closed, and damper means adjustably positioned at said inlet opening to control the admission of air therethrough, said air inlet comprising a plurality of spaced perforations, and said damper means having a plurality of spaced openings therethrough adapted to register with the perforations included in said air inlet.

10. In an automobile, an air conditioning system comprising temperature modifying means having an inlet located adjacent the floor level of the tonneau and air moving means for moving air through the temperature modifying means, a door for said automobile having a window portion, said door having a double wall construction providing an interior space forming an inlet duct for said air conditioning system, said door having an air inlet thereinto located adjacent said window portion of the door and an air outlet therefrom adapted to register with the inlet to said temperature modifying means when the door is closed, and damper means adjustably positioned at said inlet opening to control the admission of air therethrough, said air inlet comprising a plurality of spaced perforations, and said damper means comprising a sliding panel having a handle projecting therefrom and a plurality of spaced openings therethrough adapted to register with the perforations included in said air inlet.

11. In an automobile, an air conditioning system comprising temperature modifying means having an inlet located adjacent the floor level of the tonneau and air moving means for moving air through the temperature modifying means, a door for said automobile having a window portion, said door having a double wall construction providing an interior space forming an inlet duct for said air conditioning system, said door having air inlet openings thereinto located adjacent said window portion of the door and communicating with the interior of the tonneau and an air outlet therefrom adapted to register with the inlet to said temperature modifying means when the door is closed, said openings being provided in two groups, one of which affords the entrance of recirculated air from the interior of the automobile and the other of which affords the entrance of fresh air from the exterior of the automobile, and adjustably mounted damper means at each of said groups of inlet openings for the purpose of proportioning the quantities of recirculated and fresh air admitted into the interior of said door.

12. In an automobile, an air conditioning system comprising temperature modifying means having an inlet located adjacent the floor level of the tonneau and air moving means for moving air through the temperature modifying means, a door for said automobile having a window portion, said door having a double wall construction providing an interior space forming an inlet duct for said air conditioning system, said door having air inlet openings thereinto located adjacent said window portion of the door and communicating with the interior of the tonneau and an air outlet therefrom adapted to register with the inlet to said temperature modifying means when the door is closed, said openings being provided in two groups, one of which affords the entrance of recirculated air from the interior of the automobile and the other of which affords the entrance of fresh air from the exterior of the automobile, and adjustably mounted damper means at each of said groups of inlet openings for the purpose of proportioning the quantities of recirculated and fresh air admitted into the interior of said door, said damper means comprising sliding panels having openings therethrough adapted to register with the openings in said door.

13. In an automobile, an air conditioning system comprising a temperature modifying means having an inlet located adjacent the floor level of the tonneau and air moving means associated therewith, a door for said automobile having a double wall construction forming an inlet duct for said air conditioning system and a window portion, the walls of said door being shaped to provide a window frame including a horizontal ledge portion at the bottom of said window portion, and a window pane adapted to be embraced by said window frame, said door having an air inlet thereinto in said horizontal ledge portion at the bottom of the window frame and communicating with the interior of the tonneau so that the air conditioning system tends to draw heated air from adjacent the top of the tonneau into the duct portion of the door across said window pane.

14. An automobile including a double walled door having a window frame formed in the upper portion thereof, a window pane mounted in said door and adapted to be positioned in said window portion, air circulating means located in the tonneau of the automobile and having an inlet duct, the inner wall of said door having an outlet opening adapted to register with said inlet duct when the door is closed and an inlet opening extending along the lower edge of said window frame adjacent said window pane, whereby air is drawn into said air circulating means from the upper portion of the tonneau and across the inner surface of said window pane.

IAN C. McKECHNIE.